Figure 1:
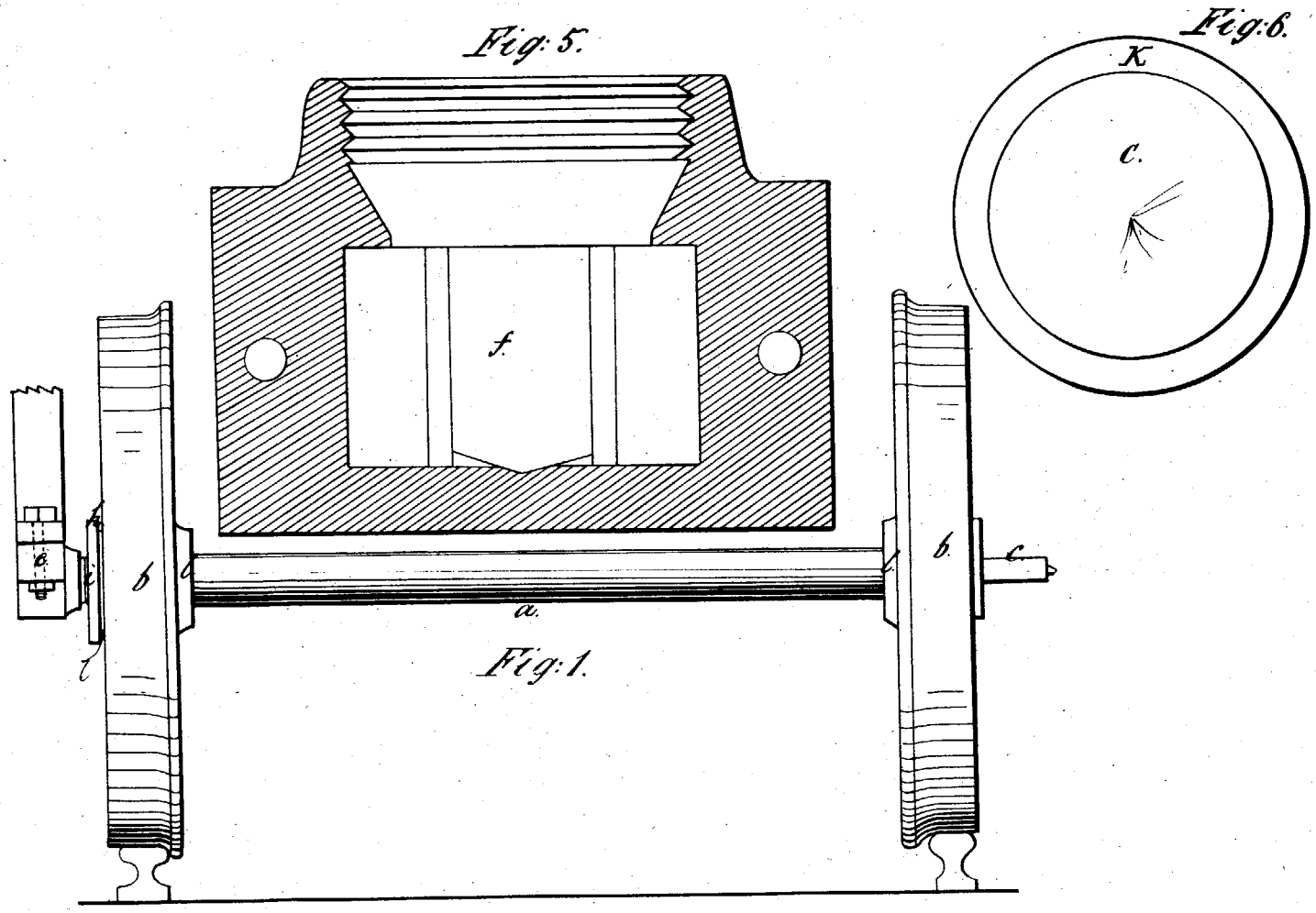
Figure 2:
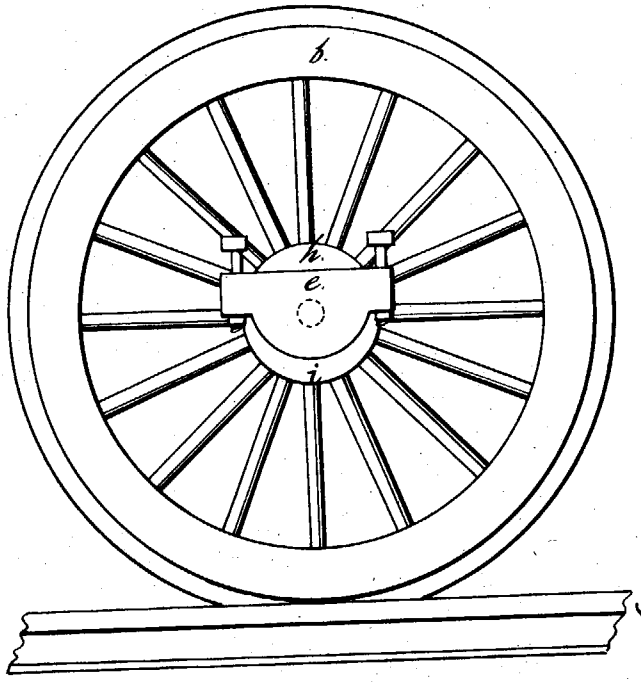
Figure 8:
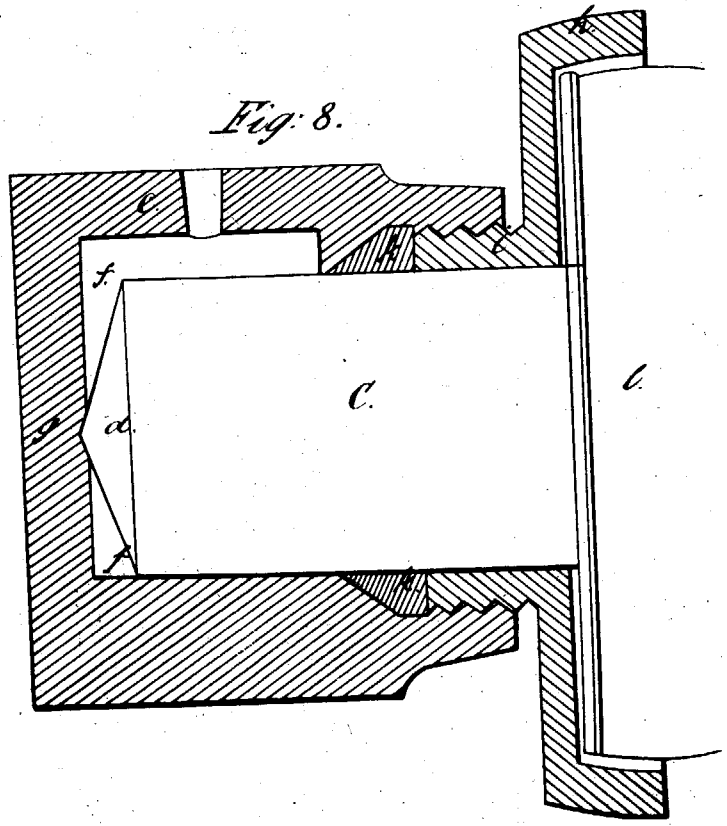
Figure 3:
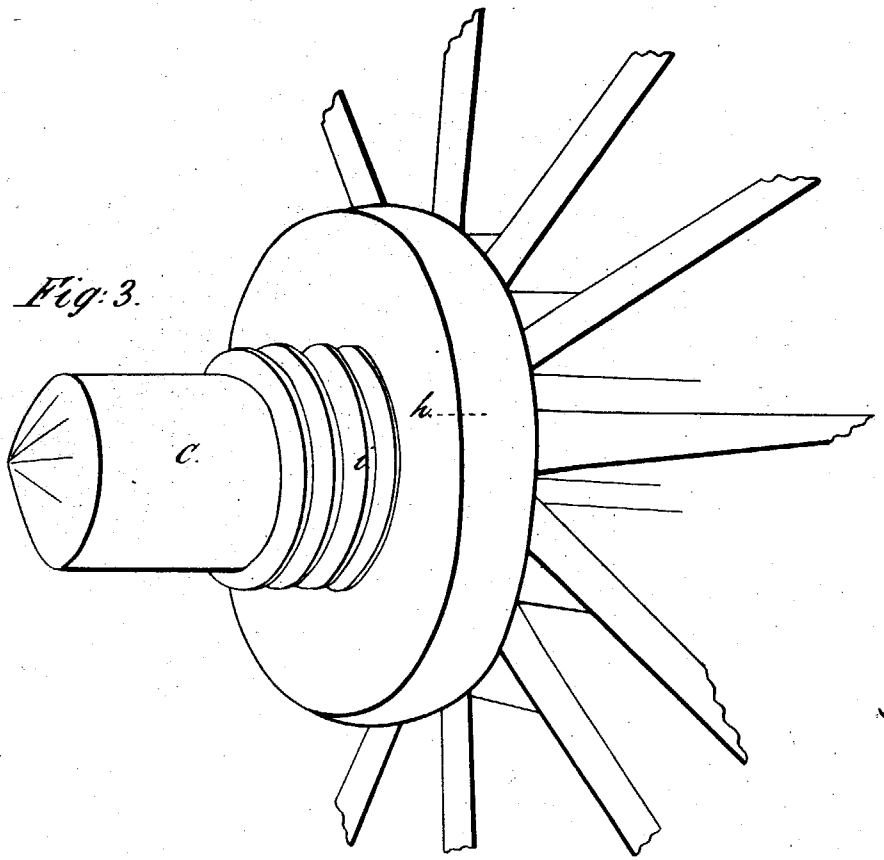
Figure 7:
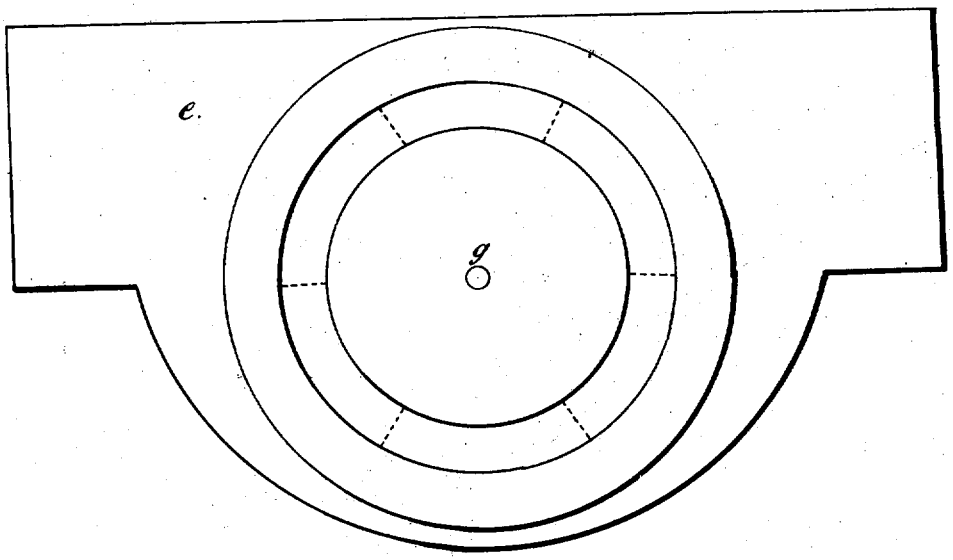
Figure 4:
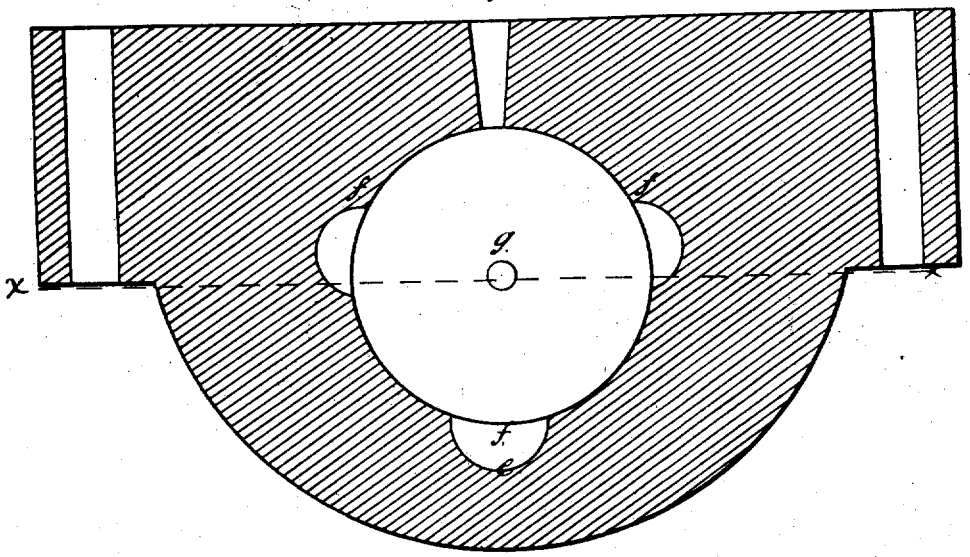

6124X

J. Elgar. Sheet 1, 4 Sheets.

Car Axle Box.

Patented Oct. 1, 1830.

6124X

J. Elgar. Sheet 2, 4 Sheets.

Car Axle Box.

Patented Oct. 1, 1830.

6124X

J. Elgar. Sheet 3, 4 Sheets.

Car Axle Box.

Patented Oct. 1, 1830.

6124X

J. Elgar. Sheet 4, 4 Sheets.

Car Axle Box.

Patented Oct. 1, 1830.

X6124 Oct. 1. 1830

John Elgar.

[illegible]

The schedule referred to in these Letters Patent and making part of the same, containing a description in the words of the said John Elgar himself, of his Improvement in the rail road car.

---

To obtain a form and combination of substances that will reduce the friction in the rubbing parts of a Rail Way Car, to its lowest point, where the "friction wheel" is not used, I adopt the admirable plan of outside journals, introduced & patented by R. Winans, The essential advantage of which is that the journals are reduced one third in diameter (of course the friction is equally reduced) still preserving the full size and strength of the axles between the wheels. The axles ex-tend thro the wheels about 2 1/2 inches, are steeled and turned to 2 in-ches diameter and hardened which forms the journal. To this journal I adapt a bearing or box of cast iron, either in two pieces, or one entire piece and to obtain an opening in the box, that shall at once combine a proper shape to fit the journal with a smooth and excessively hard sur-face it is cast upon a "chill", a piece of iron dressed to the size of the journal, but with three ribs upon it running lengthwise which divides the circular opening of the box into three parts, and reduces the bearing in the journal to 1/4 of its circumference. In the contact of substances so hard this quantity of surface is sufficient and the friction is less. — The back part of the box is at the same time chilled for the purpose of receiving against it the steel centre point of the jour-nal, that the tendency to lateral motion may be govern'd without the friction consequent upon shoulders. — To exclude dust and confine the oil, I use a packing plate similar to that which is used at the piston stem of the Steam Engine, this plate passes on the journal in front of the box, and is [illegible] to the latter with packing, of hemp, leather or cork — The side or face of the plate toward the wheel has a project-ing flange upon it, which embraces the hub and excludes the dust.

496 X6124

The box will perhaps contain one half gill of oil, beside the journal
which ensures a perfect lubrication of the latter — The improvement
that I claim as my invention, is the chilled cast iron Box combined
with the steeled centre pointed journal — The peculiar form of the
inside of the box which reduces the surface of the bearing — and the
Packing Plate. —

Exd. — Witnesses
W.H. Alexr. McIntire
Wm. P. Elliot

Jno. Elgar.

Patented October 1st. 1831.

(460 words)